United States Patent [19]
Lacombe

[11] Patent Number: 5,841,108
[45] Date of Patent: Nov. 24, 1998

[54] ELECTRICAL ELEMENT FOR HEATER PLATES, IN PARTICULAR FOR KETTLES

[75] Inventor: Jacques Lacombe, Gray, France

[73] Assignee: SEB S.A., Ecully Cedex, France

[21] Appl. No.: 787,098

[22] Filed: Jan. 22, 1997

[30] Foreign Application Priority Data

Jan. 25, 1996 [FR] France ................................. 96 00867

[51] Int. Cl.⁶ .................................................. F27B 14/00
[52] U.S. Cl. ......................... 219/441; 219/437; 219/518; 219/429; 99/281
[58] Field of Search .................... 219/437, 441, 219/518, 429, 432; 99/281

[56] References Cited

U.S. PATENT DOCUMENTS

| | | |
|---|---|---|
| 3,082,313 | 3/1963 | Jepson . |
| 3,715,567 | 2/1973 | Mandziak . |
| 4,544,830 | 10/1985 | Miller ...................................... 219/437 |
| 4,645,910 | 2/1987 | Chhatwal ................................ 219/437 |
| 4,675,508 | 6/1987 | Miyaji ..................................... 219/437 |
| 4,812,623 | 3/1989 | Haden ..................................... 219/437 |
| 5,642,725 | 7/1997 | Sharples ................................. 219/441 |
| 5,693,244 | 12/1997 | Pragt ....................................... 219/441 |

FOREIGN PATENT DOCUMENTS

| | | |
|---|---|---|
| 815241 | 7/1937 | France . |
| 35 45 445 | 6/1987 | Germany . |
| 44 03 638 | 8/1995 | Germany . |
| 94/18807 | 8/1994 | WIPO . |

*Primary Examiner*—Teresa J. Walberg
*Assistant Examiner*—Quan Nguyen
*Attorney, Agent, or Firm*—Banner & Witcoff, Ltd.

[57] ABSTRACT

A tubular electrical element lying substantially in a plane is fixed under a heater plate of an electrical appliance. The ends of the element are connected to a thermal limiter disposed near the middle of the element to measure at least the temperature of the element and to disconnect the electrical power supply from the element if the measured temperature exceeds a predetermined value. A portion of the element extends substantially along the peripheral contour of the plate and the ends of the element extend towards the middle of the element.

15 Claims, 2 Drawing Sheets

FIG_1

ELECTRICAL ELEMENT FOR HEATER PLATES, IN PARTICULAR FOR KETTLES

BACKGROUND OF THE INVENTION

1. Field of the Invention

The present invention concerns an electrical element for heater plates for electrical appliances such as kettles.

It also concerns a heater plate equipped with an element of this kind and an electric kettle having a water tank heated by a heater plate of this kind.

2. Description of the Prior Art

Many tubular electrical elements that are fixed under a plate to heat it and lie in a plane parallel to it are known in themselves.

The operation of an element of this kind is generally controlled by a thermal limiter to which the two ends of the tubular element are connected.

The basic function of the thermal limiter is that of a thermostat monitoring the heating temperature of the element. It is therefore adapted to measure the temperature of the element and to disconnect the element from the electrical power supply if its temperature exceeds a predetermined threshold value. To this end, the thermal limiter must be placed near the heating area of the element, i.e. near the middle of the tubular element.

To heat the plate uniformly, the elements used until now have always been horseshoe-shape or spiral in shape. The ends of the tubular element are then at the periphery of the heater plate. Thus connecting these ends to a thermal limiter disposed near the middle of the element requires the use of additional electrical connection members.

The aim of the present invention is to simplify the connection of the element to the thermal limiter by eliminating all such intermediate connecting members.

SUMMARY OF THE INVENTION

In one aspect the invention consists in a tubular electrical element lying substantially in a plane and adapted to be fixed under a heater plate of an electrical appliance, ends of said element being connected to a thermal limiter disposed near the middle of said element and adapted to measure at least the temperature of said element and to disconnect the electrical power supply from said element if the measured temperature exceeds a predetermined value, wherein a portion of said element extends substantially along the peripheral contour of said plate and ends of said element extend towards said middle of said element.

By virtue of this particular shape of the tubular element, its ends may be connected directly to the thermal limiter.

Moreover, the heater element extends both along the periphery of the plate and towards its center, which favors better distribution of the energy transferred to the plate and reduces the interior temperature of the heater element compared to prior art elements.

Moreover, the developed length of the heater element is increased relative to that of conventional elements which extend only along the periphery of the plate. Consequently the specific load is reduced.

This improved distribution of energy and this reduction of the specific charge significantly increase the service life of the element for a comparable power consumption.

To improve the distribution of energy even more, the electrical element is preferably symmetrical about an axis of symmetry of the heater plate.

In another aspect, the invention consists in a heater plate for use in an electrical appliance and comprising a tubular element and a thermal limiter both of which are fixed under said plate.

A heater plate of this kind is then very simple to manufacture and does not require any additional components other than the element itself and the thermal limiter.

In a third aspect, the invention consists in an electric kettle comprising a tank for liquid to be heated having a bottom under which are fixed a thermal limiter and an electrical element in accordance with the present invention.

Other features and advantages of the invention will emerge from the following description given by way of non-limiting example with reference to the accompanying drawings.

DETAILED DESCRIPTION OF THE PREFERRED EMBODIMENT

Figure 2:
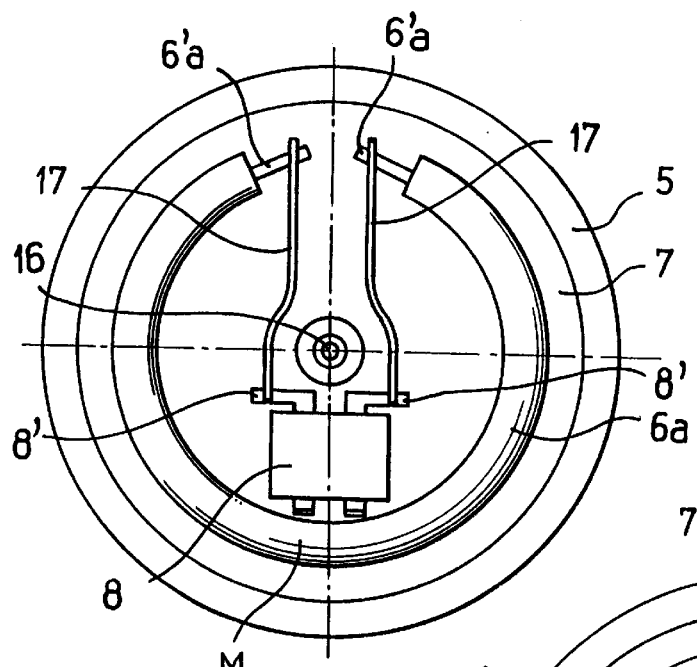
FIGS. 2 and 3 are bottom views of heater plates equipped with a prior art electrical element.
Figure 3:
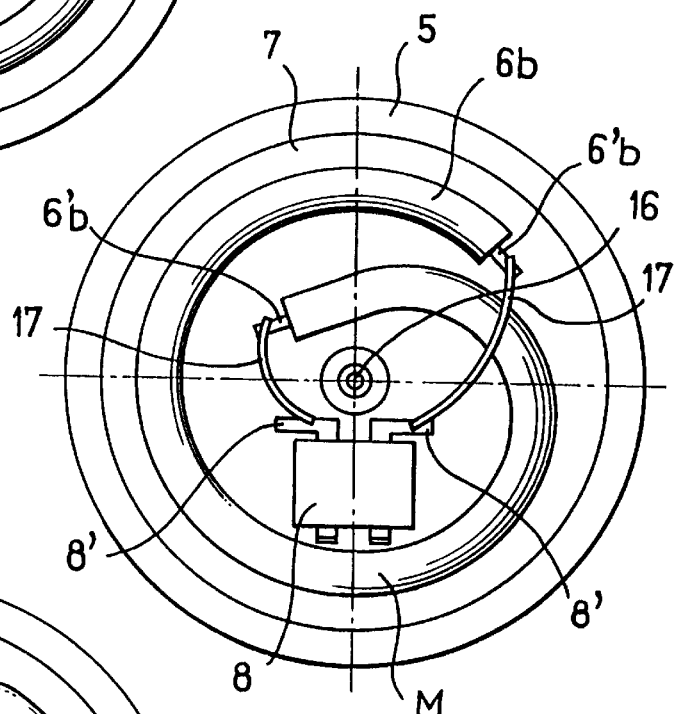

The tubular elements of the prior art, designed to be fitted to a heater plate, are first described briefly with particular reference to FIGS. 2 and 3.

A heater plate 5, which is disc-shape in these examples, carries a tubular electrical element 6a, 6b and a thermal limiter 8 having at least a thermostat function with regard to the element 6a, 6b. A plate of this kind is described in patent FR 2 708 407, for example.

In FIG. 2 the element 6a is substantially in the shape of a horseshoe while that in FIG. 3 is coiled into a spiral shape.

The elements 6a, 6b with shapes that are known in themselves have the disadvantage of having one or two connection ends 6'a, 6'b at the periphery of the plate 5, and in any event far away from the middle M of the tubular element 6a, 6b.

These ends 6'a, 6'b must therefore be connected to the connecting terminals 8' of the thermal limiter 8 by intermediate connecting members 17.

Figure 4:
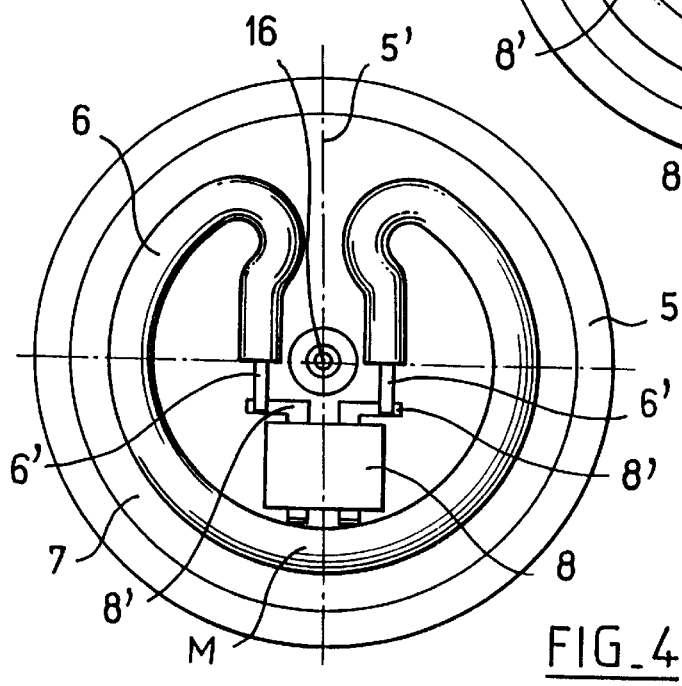
FIG. 4 is a bottom view of a heater plate equipped with an electrical element of the invention.

Referring to FIG. 4, a portion of the element 6 in accordance with the invention extends substantially along the peripheral contour of the plate 5, the ends 6' of this element 6 extending towards the middle M of the element 6.

This particular shape of the element 6 enables the ends 6' of the element 6 to be connected directly to the terminals 8' of the thermal limiter.

The element 6 is preferably symmetrical about an axis of symmetry 5' of the heater plate 5.

This feature favors uniform heating of the plate 5.

In this example, the heater plate 5 is disc-shape.

The electrical element 6 has a virtually closed circular shape, the ends 6' of the element extending parallel to an axis of symmetry 5' of the element.

Accordingly, the major part of the element 6 extends along the peripheral contour of the plate 5, the ends 6' being bent towards the interior of the circle formed by the element 6.

The axis of symmetry 5' corresponds to the diameter of the closed circle of the element 6 and passing through its middle M.

The thermal limiter 8 is located inside the circle formed by the element 6, near its middle M.

To obtain uniform and fast heating of the plate 5, a thermal diffusion plate of high thermal conductivity is preferably fixed between the heater plate 5, on the one hand, and the element 6 and the thermal limiter 8, on the other hand.

Figure 1:
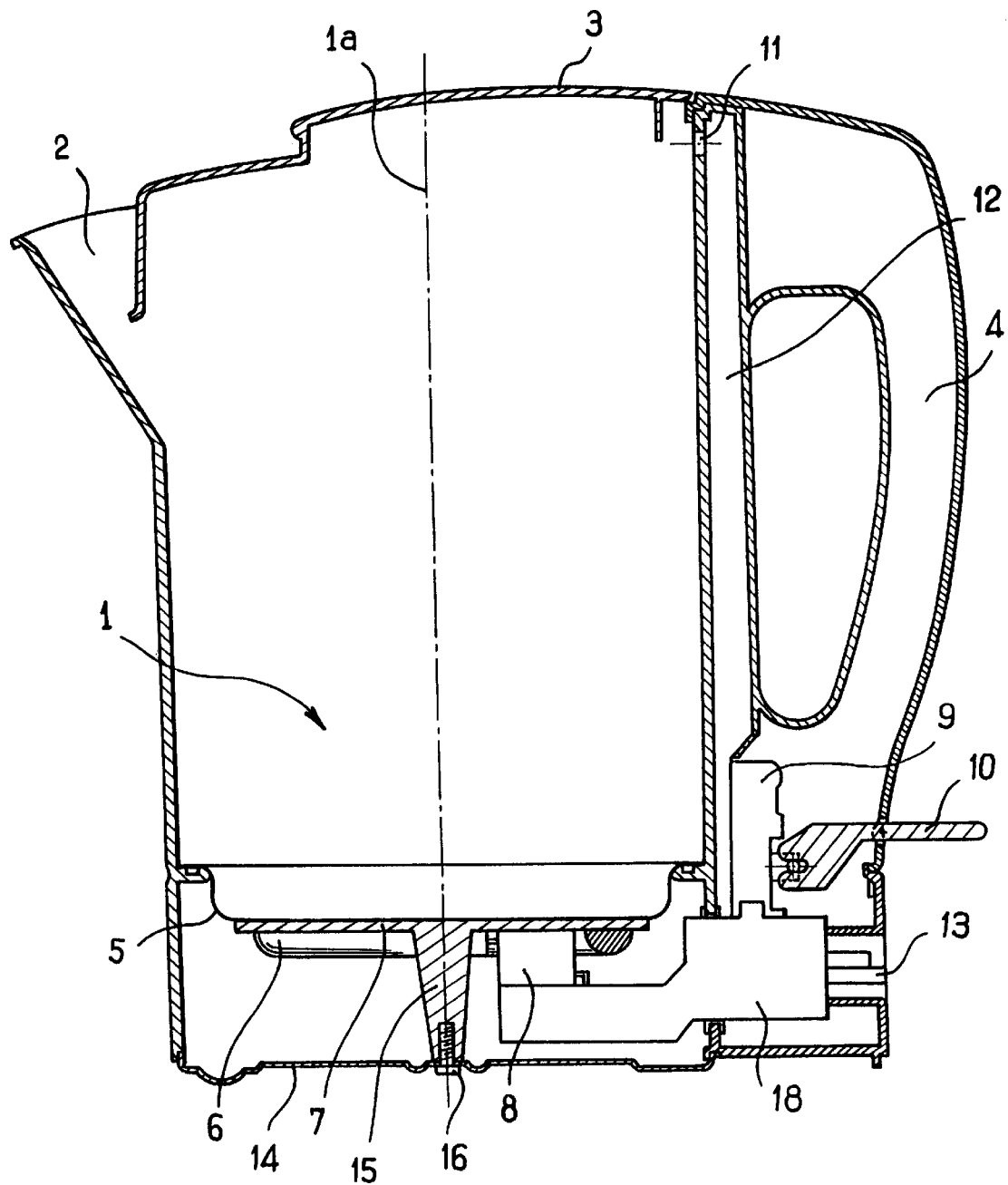
FIG. 1 is a sectional view of an electric kettle in accordance with the invention.

The type of heater plate shown in FIG. 4 can be used for an electric kettle with a heater plate, as shown in FIG. 1.

In a manner that is known in itself, the kettle comprises a water tank 1 with a pouring spout 2 and a lid 3 closing its filling hole.

Under the bottom 5 of the tank 2 is fixed a thermal diffusion plate 7 attached at the center to the base 14 of the kettle, for example by means of a screw 16 screwed into a central lug 15 on the diffusion plate 7.

The operation of the element 6 is controlled by an on/off device 10, through the intermediary of a steam sensor 9 placed at the bottom of a steam conduit 12 discharging through an orifice 11 at the top of the tank 1.

Pins 13 connect the kettle to an electrical power supply via a removable power cord.

The various connections are made by a module 18.

The boiling sensor 9 and the thermal limiter 8 control the operation of the electrical element 6 in the manner that is known in itself and in particular they disconnect the electrical power supply when boiling is detected or if the temperature of the element reaches a predetermined maximal value.

The thermal limiter 8 can also be adapted to measure the temperature of the base 5 and to disconnect the electrical power supply from the element 6 if the measured temperature exceeds a predetermined value. It therefore acts as a thermal cut-out to prevent the base 5 overheating.

Because of the shape of the element in accordance with the invention, the thermal limiter 8 is very simple to locate so that it is both in contact with the base 5, where applicable through the intermediary of the thermal diffusion plate 7, and near the middle M of the element 6.

Of course, many modifications may be made to the example described hereinabove without departing from the scope of the invention.

For example, the heater plate could equally well have a shape other than the disc shape shown, such as rectangular, oval, etc.

It could also be for electrical appliances other than a kettle.

Furthermore, the heater plate of the kettle could equally well be supplied with electrical current from a separate base unit on which the kettle stands ("cordless" kettle).

There is claimed:

1. A substantially tubular electrical element lying substantially in a plane and adapted to be fixed under a heater plate of an electrical appliance and connected to a thermal limiter and an electrical power supply, the electrical element comprising:

a middle of a length of said element; and two ends of said element each extending toward the middle of the length of said element, each end configured to be connected to the thermal limiter, the thermal limiter being adjacent to the middle of the length of said element and adapted to measure at least a temperature of the middle of the length of said element and to control an amount of power from the electrical power supply to said element responsive to the temperature of the middle of the length of said element exceeding a predetermined value, wherein a portion of said element is configured to extend substantially along a peripheral contour of said heater plate.

2. The element claimed in claim 1 wherein said element is symmetrical about an axis of symmetry of said heater plate.

3. The element claimed in claim 1 wherein said heater plate is disc-shaped and said element has a substantially closed circular shape and an axis of symmetry, each of the ends extending parallel to said axis of symmetry.

4. An apparatus comprising:

a heater plate for use in an electrical appliance;

the element as claimed in claim 1; and a thermal limiter, the element and the thermal limiter both being disposed under said heater plate.

5. The apparatus as claimed in claim 4 and further comprising a thermal diffusion plate fixed between said heater plate, on the one hand, and said element and said thermal limiter, on the other hand.

6. An electric kettle comprising:

a storage tank for liquid to be heated having a bottom;

a thermal limiter; and the electrical element as claimed in claim 1, the thermal limiter and the electrical element both being disposed under the bottom of the storage tank.

7. The electric kettle claimed in claim 6 wherein said thermal limiter is further adapted to measure the temperature of said base and to disconnect the power supply from said element if the measured temperature exceeds a predetermined value.

8. An apparatus comprising:

a heater plate for use in an electrical appliance;

the element as claimed in claim 2; and a thermal limiter, the element and the thermal limiter both being disposed under said heater plate.

9. An apparatus comprising:

a heater plate for use in an electrical appliance;

the element as claimed in claim 3; and a thermal limiter, the element and the thermal limiter both being disposed under said heater plate.

10. The apparatus as claimed in claim 8 further comprising a thermal diffusion plate fixed between said heater plate, on the one hand, and said element and said thermal limiter, on the other hand.

11. The apparatus as claimed in claim 9 further comprising a thermal diffusion plate fixed between said heater plate, on the one hand, and said element and said thermal limiter, on the other hand.

12. An electric kettle comprising a storage tank for liquid to be heated having a bottom under which are fixed a thermal limiter and an electrical element as claimed in claim 2.

13. An electric kettle comprising a storage tank for liquid to be heated having a bottom under which are fixed a thermal limiter and an electrical element as claimed in claim 3.

14. The electric kettle claimed in claim 12 wherein said thermal limiter is further adapted to measure the temperature of said base and to disconnect the power supply from said element if the measured temperature exceeds a predetermined value.

15. The electric kettle claimed in claim 13 wherein said thermal limiter is further adapted to measure the temperature of said base and to disconnect the power supply from said element if the measured temperature exceeds a predetermined value.

* * * * *